J. O. TUTTLE.
HEN'S NEST.
APPLICATION FILED AUG. 31, 1915.

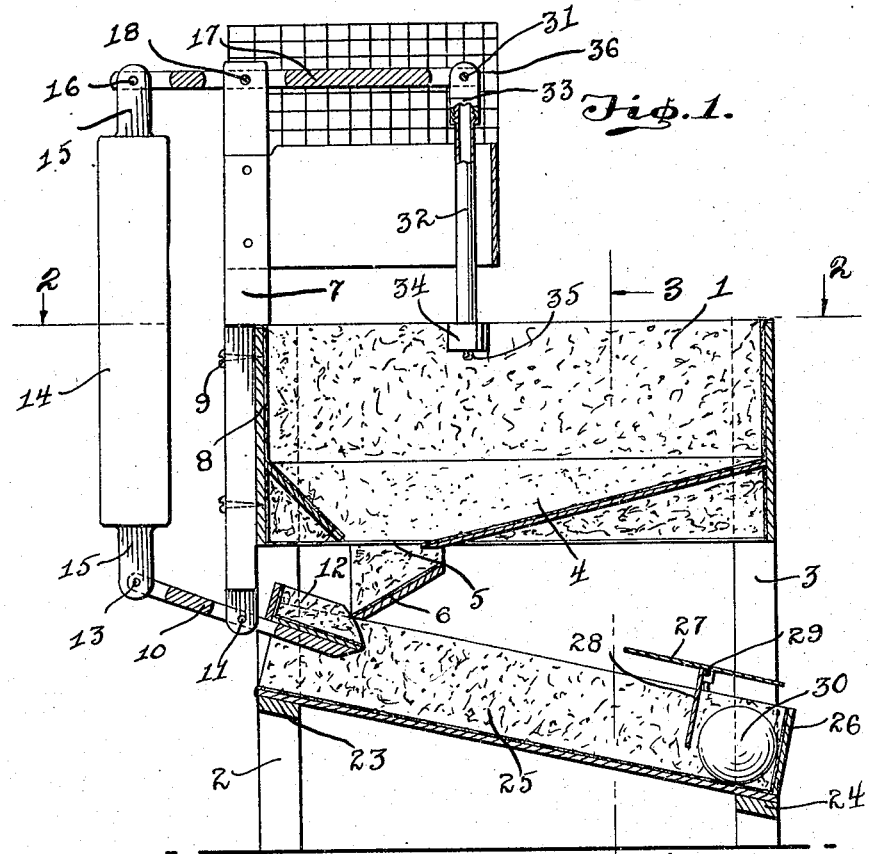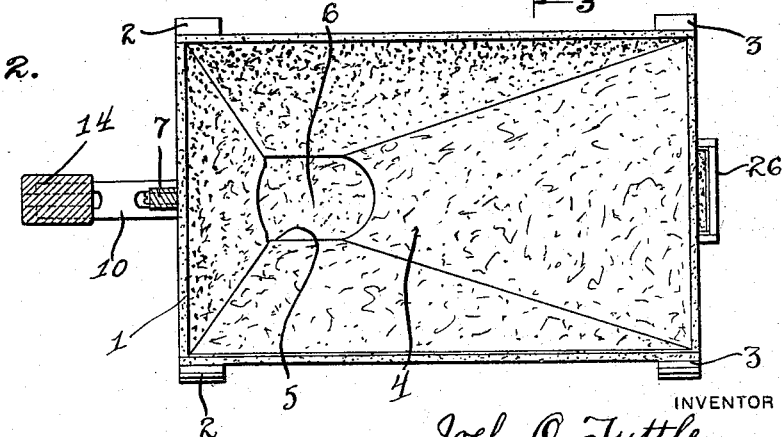

1,199,944.

Patented Oct. 3, 1916.
2 SHEETS—SHEET 2.

INVENTOR
Joel O. Tuttle.

WITNESSES
Edw. S. Hall.

BY Richard Owen.
ATTORNEY

UNITED STATES PATENT OFFICE.

JOEL O. TUTTLE, OF RICHLAND, OREGON.

HEN'S NEST.

1,199,944.  Specification of Letters Patent.  Patented Oct. 3, 1916.

Application filed August 31, 1915. Serial No. 48,332.

*To all whom it may concern:*

Be it known that I, JOEL O. TUTTLE, a citizen of the United States, residing at Richland, in the county of Baker and State of Oregon, have invented certain new and useful Improvements in Hens' Nests, of which the following is a specification.

My invention relates to hens' nests and more particularly to a hen's nest adapted for receiving and retaining eggs deposited by a hen.

The primary object of my invention is to provide a device of the class above described which automatically receives an egg and thereby disturbs the hen and causes her to leave the nest immediately upon laying the egg.

Another object of my invention is to provide means which will automatically mark a hen with a colored dye or the like for identification purposes.

With the above description taken in connection with the accompanying drawings, it is thought that a clear and comprehensive understanding of the construction, operation and advantages of my invention may be readily gathered and while I have shown and described the same as embodying a specific structure, I reserve the right to make changes therein which do not depart from the spirit and scope of the invention as claimed.

Figure 3:
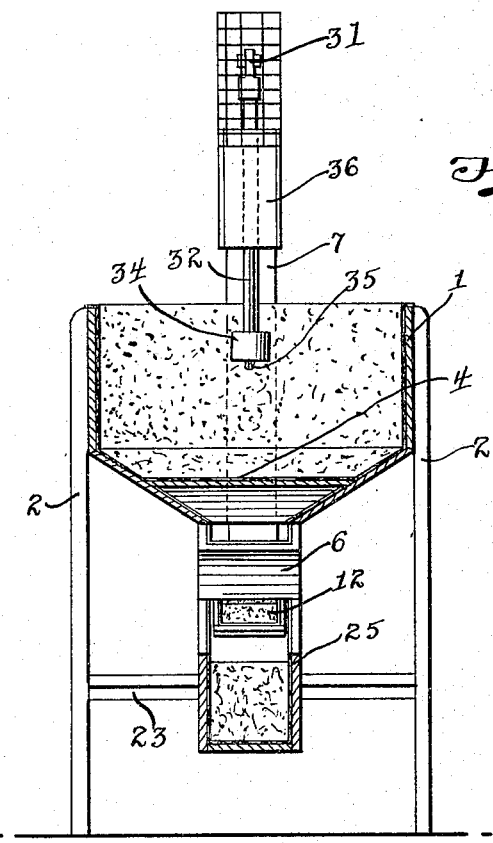
Figure 4:
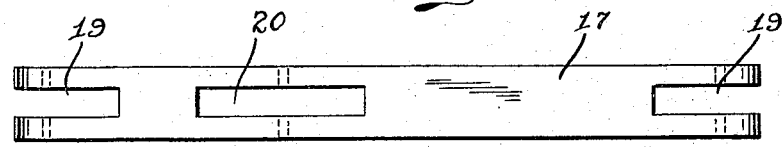
Figure 5:
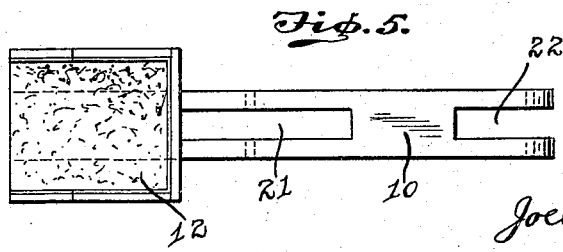

Figure 1 is a longitudinal sectional view of the hen's nest constructed in accordance with my invention, Fig. 2 is a sectional view taken on a line 2—2 of Fig. 1 looking in the direction of the arrows, Fig. 3 is a transverse sectional view taken on a line 3—3 of Fig. 1 looking in the direction of the arrows. Fig. 4 is an enlarged detailed elevational view of one element of the invention and Fig. 5 is a smaller view of the egg receiver.

Similar reference characters designate similar parts throughout the various views of the drawings.

In the drawings wherein a preferred embodiment of my invention is illustrated, I have provided a hen's nest having a body 1 supported on front and rear legs 2 and 3, respectively, said legs being mounted at each corner of the nest.

The nest is provided with a bottom wall 4 inclined rearwardly to deliver an egg to an outlet aperture 5. An egg deflector or chute 6 is provided disposed beneath said outlet opening to direct an egg to a pivoted receiver hereinafter described.

I provide mechanism for marking a hen and also disturbing her and causing her exit. This mechanism comprises a vertical standard 7 mounted on the rear wall 8 of the nest 1 and preferably permanently secured thereto by screws or the like. The lower extremity of said standard 7 projects below the bottom of the nest and serves as a bearing for an arm 10 pivotally mounted at 11 to said standard. One extremity of said arm 10 carries an egg receiving and deflecting member 12 and the opposite extremity a pivotal connection as at 13 with a counterweight 14, the opposite extremities of said counterweight having reduced portions 15 as shown to advantage in Fig. 1. The upper extremity of the counterweight 14 has pivotal connection as at 16 with a second arm 17 pivoted at 18 on the upper extremity of said standard. The arms 10 and 17 are shown to advantage in Figs. 5 and 4, respectively. As shown to advantage in these figures, the opposite extremities of the arm 17 are bifurcated as indicated at 19 facilitating connection of said arm to the other elements of the invention. The arm 17 is also provided centrally with an elongated aperture 20 to facilitate its pivotal mounting on a standard 7. The arm 10 is similarly formed having a centrally located elongated aperture 21 and a bifurcated extremity 22. The rear and front legs 2 and 3 are connected by transversely extending beams 23 and 24 respectively, said beams serving to support an inclined trough 25 down which the eggs are permitted to roll. The lower extremity of said trough is closed by an end wall 26. As clearly shown in the drawings, the nest 1, chute 6, egg receiver and deflector 12, and the trough 25 are lined with a soft shock absorbing material so as to prevent jarring the eggs. An indicating means is provided for apprising the presence of an egg in the lower extremity of the trough 25 and this indicator comprises two strips of material 27 and 28 disposed substantially at right angles to each other and rotatably mounted as indicated at 29. An egg is designated 30 and is shown in the lower extremity of the trough.

The hen disturbing and marking device is carried by the inner free extremity of the arm 17 and has pivotal connection therewith as indicated at 31. The disturbing and marking device comprises a tubular body 32 having a connecting head 33 attachably associated therewith and a threaded cap 34 of the lower extremity thereof, said cap having a suitable aperture through which a marking wick or the like projects. The tube 35 is filled with a suitable marking liquid such as ink and when an egg is deposited in the nest, the same will roll down in the inclined bottom 4 through the aperture 5 and thence be directed on to the receiver 12 by the chute 6. The receiver will be swung downwardly on a pivot 11 through the weight of the egg and cause the arm 17 to be moved in a like manner. This will deliver a blow through the tubular member 32 to the hen which will disturb her as well as mark her with the colored liquid, this making identification possible. A plurality of these nests can be placed in the usual coop and their operation will be found to be extremely satisfactory, particularly on large poultry farms, where the identification of the eggs laid by certain of the hens is rendered extremely difficult owing to the large numbers. A suitable guard 36 may be mounted above the tubular member 32 in order to prevent roosting of the fowls thereon. It will be readily understood that a plurality of the indicators shown may be provided in each trough whereby to serve both as indicating means and as egg separators. Attention is called to the counterweight 14, this counterweight serving to normally balance the arms 17 and 10, and the tubular member 32 in the position shown.

From the above description taken in connection with the accompanying drawings, it is thought that a clear and comprehensive understanding of the construction, operation and advantages of my invention may be readily gathered and while I have shown and described the same as embodying a specific structure, I reserve the right to make changes therein which do not depart from the spirit and scope of the invention as claimed.

What I claim is:

1. A hen's nest, including a receptacle having an inclined bottom and an outlet aperture, a pivoted egg receiver, a trough, and striking means actuatable by said egg receiver to disturb a hen after depositing an egg.

2. A hen's nest, including a receptacle having an inclined bottom and an outlet aperture, a pivoted egg receiver adjacent said aperture and means actuatable thereby to strike and mark a hen upon depositing an egg.

3. A hen's nest, including a receptacle having an inclined bottom and an outlet aperture, an egg receiving and deflecting member, a trough subjacent said deflector, a counterweight, and means associated therewith for marking and striking a hen when an egg is deposited on said receiver and deflector.

4. A hen's nest, including a receptacle having an inclined bottom and an outlet aperture, means for receiving an egg deposited in said nest and means associated therewith to mark and strike a hen.

5. A hen disturbing and marking device, including, in combination with a hen's nest, a pivoted arm, an egg receiver on said arm, a counterweight having pivotal connection with said arm, and a tubular member containing marking fluid on said second arm disposed in said nest.

6. A hen disturbing and marking device, including, in combination with a hen's nest, a pivoted arm, an egg receiver on said arm, a counterweight having pivotal connection with said arm, and a tubular member containing marking fluid on said arm disposed in said nest, said tubular member adapted to mark and strike a hen.

7. A hen disturbing and marking device, including, in combination with a hen's nest, a pivoted arm, an egg receiver pivotally supported upon said arm, a counterweight having pivotal connection with said arm, a tubular member containing marking fluid on said second arm disposed in said nest, and a trough for receiving the eggs.

8. A hen's nest including a receptacle having an inclined bottom and an outlet aperture, a pivoted egg receiver, a counterweight having connection with said egg receiver, a tubular member containing marking fluid pivotally connected with said counterweight, a trough, said tubular member adapted to mark and strike the hen.

In testimony whereof I affix my signature in presence of two witnesses.

JOEL O. TUTTLE.

Witnesses:
 SAM J. MATHEWS,
 M. A. THORP.